United States Patent
Yokota et al.

(10) Patent No.: US 6,946,095 B2
(45) Date of Patent: Sep. 20, 2005

(54) FILTER FOR MOLTEN ALUMINUM ALLOY OR MOLTEN ALUMINUM

(75) Inventors: Masakatsu Yokota, Shinagawa-ku (JP); Kenji Osumi, Kobe (JP); Yutaka Nagakura, Kobe (JP)

(73) Assignees: Kabushiki Kaisha Kobe Seiko Sho, Kobe (JP); Showa Denko K.K., Tokyo (JP); Sky Aluminium Co., Ltd., Tokyo (JP); Sumitomo Light Metal Industries, Ltd., Tokyo (JP); Nippon Light Metal Company, Ltd., Tokyo (JP); The Furukawa Electric Co., Ltd., Tokyo (JP); Mitsubishi Aluminum Co., Ltd., Tokyo (JP)

(*) Notice: Subject to any disclaimer, the term of this patent is extended or adjusted under 35 U.S.C. 154(b) by 761 days.

(21) Appl. No.: 09/876,021

(22) Filed: Jun. 8, 2001

(65) Prior Publication Data

US 2004/0245685 A1 Dec. 9, 2004

(51) Int. Cl.$^7$ .................................. C22B 15/00
(52) U.S. Cl. ........................ 266/202; 266/227
(58) Field of Search ...................... 266/227, 236, 266/202

(56) References Cited

U.S. PATENT DOCUMENTS

| 5,028,036 A | * | 7/1991 | Sane et al. | 266/227 |
| 5,104,540 A | * | 4/1992 | Day et al. | 266/227 |
| 5,520,823 A | * | 5/1996 | Jones et al. | 210/767 |
| 6,521,015 B1 | * | 2/2003 | Eckert | 266/227 |

FOREIGN PATENT DOCUMENTS

JP  2000-297333 A  * 10/2000  ................ 266/227

OTHER PUBLICATIONS

English language translation of Japanese 2000–297333A, Oct. 24, 2000.*

* cited by examiner

*Primary Examiner*—Scott Kastler
(74) *Attorney, Agent, or Firm*—Oblon, Spivak, McClelland, Maier & Neustadt, P.C.

(57) ABSTRACT

The invention provides an internal filter with an improved filtering ability of removing particularly fine inclusion particles from molten aluminum or molten aluminum alloy. The internal filter includes an aggregate meshed member made of a refractory material and a coating layer formed on a surface of the aggregate meshed member. The coating layer contains a soda silicate that is able to be softened or viscous at a temperature of the molten aluminum alloy.

15 Claims, 2 Drawing Sheets

FILTER FOR MOLTEN ALUMINUM ALLOY OR MOLTEN ALUMINUM

BACKGROUND OF THE INVENTION

1. Field of the Invention

The present invention relates to a filter for removing inclusions from molten pure aluminum or molten aluminum alloy (hereinafter, referred to as "molten Al" as a whole).

2. Description of the Related Art

The energy necessary for remelting aluminum is only 1/30 time of that for electrolytic refining of aluminum ore. Therefore, the recycling aluminum scrap (i.e. remelting the aluminum scrap for use as raw material to be melted) can give a considerably large amount of energy savings and thus bring great advantages.

However, the aluminum scrap generally contains various impurities at high concentrations. Thereby, the molten aluminum or molten aluminum alloy obtained by remelting such an aluminum scrap is likely to contain a variety of inclusions including many kinds of non-metallic inclusions. The non-metallic inclusions are, for example, oxides contained originally in the aluminum scrap to be used as the raw material to be melted (hereinafter, referred to simply as "raw material") or oxides produced by the reaction of the impurities contained in the aluminum scrap with oxygen in the atmosphere during the remelting. Compared with using aluminum ore, the above-mentioned problem of the oxide inclusions is more severe when using the aluminum scrap as raw material. Examples for such oxide inclusions are alumina ($Al_2O_3$), spinel ($MgAl_2O_4$), and magnesia (MgO).

Consequently, in case of using such an aluminum scrap of aluminum alloy products as a part or all of the raw aluminum material, it is necessary to remove inclusions at least from the molten Al obtained by melting the raw aluminum material. Therefore, in addition to the refining process such as a degassing of the molten Al with using a flux, performed has been a process of removing inclusions from the molten Al such as the killing method, active gas method and molten Al filtering.

According to the killing method, the molten Al is let stand still in an undisturbed state. This still standing floats up inclusions in the molten Al or settles them to the molten Al bottom, because specific weights of the inclusions differ from that of the molten Al. Thus, the separation of the inclusions from the molten Al can be achieved. The separation efficiency, however, is extremely poor. This is because 1) the specific weight difference between each of the inclusions and the molten Al is not satisfactorily large, and 2) the wettability therebetween is considerably large. Consequently, there is the problem that large amounts of the inclusions remain in the molten Al even after a long period of time to complete this method.

According to the active gas method, an inert gas or a halogen gas is introduced to the molten Al to generate gas bubbles. The inclusions adhere to the bubbles and float up together in the molten Al, to separate the inclusions from the molten Al. This method is particularly advantageous for removing gas, such as hydrogen. However, the rising gas bubbles violently wave the molten Al surface and thereby stir the molten Al. This causes another problem that the aluminum oxide film formed on the molten Al surface is likely to be mixed back into the molten Al, resulting in an increased amount of alumina inclusions instead.

According to the molten Al filtering method, the molten Al is allowed to pass through a refractory filter to remove the inclusions therefrom. It is possible to remove relatively large particles of inclusions from the molten Al. However, there is a difficulty of removing small inclusion particles of 100 $\mu$m or less, which account for most of the inclusions. In particular, it is difficult to remove fine inclusion particles of about 10 to 25 $\mu$m, although such a removal is inevitable to obtain high quality aluminum alloys. In order to remove such fine inclusion particles, the conventional filter needs to have a finer mesh. However, in case that the mesh is too fine, when the molten Al has large amounts of inclusions, there is a practical problem that the filter may be clogged in a short-term operation, resulting in a shortened filter lifetime.

Therefore, there has been a demand for a filtering technology that can simultaneously solve the conflicting conventional problems, i.e., a filtering technology capable of reducing inclusions to a given amount that ensures the required molten Al quality and having a sufficiently long filter life, even when the molten Al is obtained by using scrap of aluminum alloy products as a part or all of the aluminum raw material and thereby the molten aluminum alloy contains a large amount of non-metallic inclusions and, in addition, when the non-metallic inclusions includes fine inclusion particles of about 10 to 25 $\mu$m for the most part.

For this purpose, the inventors have proposed a novel filter in Japanese Unexamined Patent Publication Nos. 07-207355A and 09-235629A, instead of the above-mentioned conventional filter that is made only of a refractory aggregate meshed member in which the filtering is performed only by depositing inclusion particles on the filter surface (this type is called "surface filter"). The proposed novel filter includes a refractory aggregate meshed member coated with a compound that is able to be softened or viscous at the temperature of molten aluminum alloy. With this filter, the inclusion particles can be adsorbed by the coating compound (i.e., the coating layer of the aggregate meshed member), to be removed from the molten Al (this type is called "internal filter").

Specific examples of the coating compound of the internal filter include $MnO_2$, $Bi_2O_3$, NaO, $B_2O_3$, $MgBr_2$, NaBr, $Na_2CO_3$, $CrCl_2$, KCl, NaCl, $SrCl_2$, $Na_3AlF_6$, $AlK(SO_4)_2$, $K_2SO_4$, etc. (Japanese Unexamined Patent Publication No. 09-235629A) and other K or Li alkali metal sulfates, borates, carbonates ($K_2SO_4$, $Li_2SO_4$, $Li_2B_2O_7$, $Li_3CO_3$) etc.

However, it is necessary to use an adhesive to bond these $MnO_2$ etc. and K or Li alkali metal sulfates etc. (referred to as "conventional coating compounds" in the following) to the surface of the aggregate meshed member, in order to ensure such a strong adhesion therebetween that can resist the impact strength and adhesive strength of the molten Al flow. The reasons are as follows. Any of these conventional coating compounds itself does not have a satisfactorily large adhesion strength with the aggregate meshed member surface. So, when the meshed member is coated only with these compounds (without any adhesive), the compounds may peel off during the filtering, due to the impact strength and adhesive strength of the molten Al flow. This may severely shorten the filter lifetime. Therefore, without using any adhesive, the conventional coating compounds are difficult to apply to a practical molten Al alloy internal filter despite of their excellent adsorbabilities.

As the adhesive to be used together with the conventional coating compounds at a given high temperature, such materials as silica sols is inevitably selected. This is because, it have an excellent thermal resistance when used together with the coating compounds. However, silica sols and other adhesives have an extremely poor inclusion adsorbability, compared with any of the conventional coating compounds (about 15 to 30% of the conventional coating compounds). Therefore, as the adhesive amount increases to ensure the strong adhesion between the coating compound and the aggregate meshed member surface, the coating compound amount decreases by the same amount, resulting in deteriorating the adsorbability of the filter.

Moreover, the filtering ability (efficiency) of the filter to remove inclusions from the molten Al depends mostly on the roughness of the openings formed in the aggregate meshed member and the configuration of the meshed member. Consequently, particularly to remove fine inclusion particles of about 10 to 25 $\mu$m, the aggregate meshed member needs to have 2 mesh or more per linear inch (that is, a mesh number of 2 or more).

On the other hand, in order to make the internal filter, an aggregate, for example ceramics, is formed into a meshed shape and baked, to obtain the aggregate meshed member. Then, the aggregate meshed member is impregnated with any one or more of the above-mentioned coating compounds to coat the surface thereof. When the adhesive is used, the meshed member is impregnated sequentially with the adhesive and with the coating compounds. Alternatively, it is impregnated with a mixture of the coating compounds and the adhesive. In any case, the impregnating material, with which the meshed member is impregnated, exhibits considerably high viscosity due to the original physical properties of the coating compounds and the adhesive. The higher the viscosity of the impregnating material is and the finer the mesh of the aggregate meshed member is, the more difficult the coating process becomes. Especially, it is virtually impossible to completely coat not only the meshed member outer surfaces but also the inner surfaces of its openings (pores), even if such surfaces are located in the center of the meshed member, or coat the entire surface of the meshed member constituting a filter.

Consequently, when the above-mentioned conventional coating compounds are applied to the internal filter, the coating efficiency with respect to the entire surface of the meshed member is likely to be low, thereby giving the internal filter a low efficiency of removing inclusions per filter unit volume and filter unit weight. This low removal efficiency may prevent the internal filter from applying to the filtering of molten aluminum alloys.

SUMMARY OF THE INVENTION

The present invention has been conceived in light of these problems, and it is an object of the present invention to provide an internal filter with an improved efficiency of removing especially fine inclusions of about 10 to 25 $\mu$m.

According to an aspect of the present invention, a molten aluminum alloy filter for removing inclusions from molten aluminum alloy includes a aggregate meshed member made of a refractory material and a coating layer formed on a surface of the meshed member. The coating layer has a soda silicate capable of being softened or viscous at a temperature of the molten aluminum or molten aluminum alloy.

The meshed member preferably has a number of meshes per inch of 2 or more, more preferably 6 or more.

It is preferred that the soda silicate is coated directly on the meshed member surface, i.e., without using any adhesive.

The above-mentioned filter can be arranged in a position between a melting furnace for melting and, if necessary, refining a raw aluminum material and a die for casting the molten aluminum or molten aluminum alloy supplied thereto.

Particularly, the filter can be arranged in a molten Al conduit for transferring the molten Aluminum or molten Aluminum alloy. Alternatively, it is arranged in a filter box that is placed in the molten Al conduit.

A portion or all of the raw aluminum material according to the present invention may be made of aluminum alloy scrap.

According to another aspect of the present invention, a system for producing aluminum alloy includes a melting furnace for melting a raw aluminum material to obtain a molten aluminum alloy, a die for casting the molten aluminum alloy, a molten Al conduit for transferring the molten aluminum alloy from the melting furnace to the die and a filter provided in the molten Al conduit for removing inclusions from the molten aluminum alloy. The filter includes a aggregate meshed member made of a refractory material and a coating layer formed on a surface of the meshed member. The coating layer has a soda silicate that is able to be softened or viscous at a temperature of the molten aluminum or molten aluminum alloy.

In the system, the filter is preferably arranged in a position immediate upstream of the die.

According to a further aspect of the present invention, a method for producing aluminum alloy includes steps of melting a raw aluminum material to obtain a molten aluminum alloy, removing inclusions from the molten aluminum alloy by adsorbing inclusions by a soda silicate so as to filter the molten aluminum alloy and casting the molten aluminum alloy.

The inventors of the present invention have found that, when the aggregate meshed member is coated with soda silicate to form an internal filter, the resultant filter has the following advantages: ① even without using any adhesive (i.e., soda silicate is coated directly on the meshed member surface), it is possible to ensure a strong adhesion between the coating compound and the meshed member surface so as to resist the impact strength and adhesive strength of the molten Al flow; and ② even in the case that the meshed member has a number of meshes per linear inch of two or more (i.e., 2 or more openings per inch), such a compound as soda silicate can sufficiently cover as far as the center of inner surfaces of openings formed in the aggregate meshed member or the entire surface of the aggregate meshed member, resulting in an increased inclusion removal ratio per filter unit volume and filter unit weight. In particular, the advantage ② can considerably improve the removal ratio of fine inclusion particles of about 10 to 25 $\mu$m.

The soda silicate (sodium silicate) includes many kinds of compounds having various compositions. Of these, water soluble compounds can be used in the present invention. Accordingly, the soda silicate according to the present invention includes water soluble salts of the general formula $Na_xSi_yO_z$ (x=2,4; y=1,2,4; z=3,4,5,9), such as sodium meta-silicate ($Na_2SiO_3$), sodium ortho-silicate ($Na_4SiO_4$), $Na_2Si_2O_5$ and $Na_2Si_4O_9$. Aqueous solutions of a mixture of these salts are referred to as "water glass".

Generally, the water glass itself is used as an adhesive for bonding artificial stone, glass or ceramics, or contained in fire-proof and acid-proof coatings as an adhesive. It is also used as a cement admixture and soil hardener. Moreover, it is widely known that it can be used as a raw material for silica gels, which are moisture absorbents. Accordingly, it is known that both soda silicate and water glass are excellent in an adhesion to glass and ceramics and in a hygroscopic property. However, it has not been known that both soda silicate and water glass have an excellent adsorbability of inclusions contained in molten aluminum alloys, and moreover, that their adsorbability with respect to the inclusions is higher than that with respect to the molten aluminum alloys. Furthermore, it has not been known that such an adsorbability makes it possible to apply soda silicate and water glass to a filter for removing inclusions from the molten aluminum alloys.

DESCRIPTION OF THE PREFERRED EMBODIMENTS

Refractory Aggregate

Figure 1:
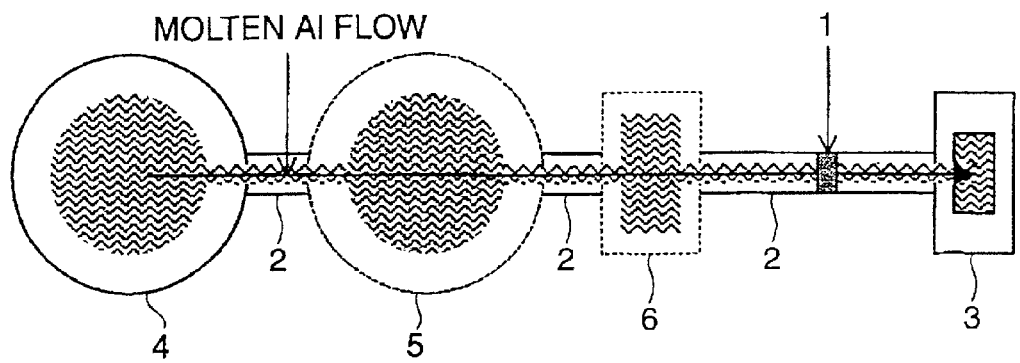
FIG. 1 is a schematic diagram showing a position where a filter for molten Al is arranged according to an embodiment of the present invention.

The filtering ability (i.e., the efficiency of removing inclusions) depends mostly on the mesh roughness (mesh number) formed in the aggregate meshed member. Therefore, in order to remove small inclusion particles of about 10 to 25 $\mu$m as mentioned above, it is preferable that the refractory aggregate meshed member according to the present invention has a fine mesh, specifically having 2 openings or more per inch, more preferably having 6 openings or more per inch. It However, in case that there are a large amount of inclusions, too fine mesh may give a practical problem that the filter is clogged up within a relatively short-term operation, thereby shortening the filter lifetime. Accordingly, the fineness of the mesh is preferably 10 openings or less per inch in order to prevent decreasing the filter life.

As the refractory material for the aggregate meshed member, used can be any refractory materials from which the meshed member can be formed. The conventional refractory materials can be chosen as appropriate from alumina, magnesia, silica, mullite, silicon carbide, and mixtures thereof. Then, a clay or slurry of these ceramics are formed and baked into a porous body of a suitable shape having a desired meshed size, such as noodle, honeycomb and tube shapes, to form the meshed member. The suitable shape of the meshed member allows the obtained filter to have a required strength for resisting thermal shocks and abrasion caused by the molten Al.

Alternatively, it is possible to make a filter with the desired fine mesh by: 1) mixing small pieces or beads of plastic, such as foamed styrene, into the kneaded or mixed clay or slurry of the above-mentioned ceramics; 2) forming the clay or slurry into an appropriate shape; and 3) baking the formed body with the plastic pieces or beads burned away. The burnt away plastic pieces or beads left holes in the baked body, to serve as the openings of the resultant filter. With this method, it is better possible to obtain the desired mesh with a more sufficient fineness, more homogeneous opening distribution and more uniform diameter of its openings, compared with the above-mentioned method in which the ceramics is formed into a noodle or honeycomb shapes for example. As a result, the resultant filter according to this method with plastic pieces or beads makes possible to remove finer inclusion particles of about 10 to 25 $\mu$m more efficiently.

Soda Silicate

The soda silicate in the present invention has the required properties as the coating compound for the internal filter. Firstly, the coating compound needs to be softened or viscous at the temperature of molten aluminum alloy to adsorb (or adhere) inclusions contained in the molten Al. However, the coating compound should not melt at the molten Al temperature. This is because, if it melts, the melted coating compound may bleed, along with inclusions once adhered thereto in some cases, into the molten Al flow to contaminate the molten Al. Therefore, to keep the coating compound soft and, at the same time, prevent it from melting during the filtering process, the coating compound needs to satisfy the relation of:

a softening temperature of the coating compound $\leq$ molten Al temperature $\geq$ a melting point of the coating compound.

Soda silicate can satisfy this property, since it has: 1) a melting point of about 730 to 870° C. (depending on its composition, particularly its ratios of $Na_2O$ and $SiO_2$) that is almost equal to or higher than the molten Al temperature (about 750° C.); and 2) a softening temperature of about 600° C. (also depending on its composition) that is almost equal to or lower than the molten Al temperature.

Secondly, the soda silicate of the present invention has an excellent adhesion strength to the surface of the aggregate meshed member, so as to resist the impact strength and adhesive strength of the molten Al stream. The adhesion strength is superior to the conventional coating compounds mentioned in Japanese Unexamined Patent Publication Nos. 07-207355A and 09-235629A ($MnO_2$, $Bi_2O_3$, $NaO$, $B_2O_3$, $MgBr_2$, $NaBr$, $Na_2CO_3$, $CrCl_2$, $KCl$, $NaCl$, $SrCl_2$, $Na_3AlF_6$, $AlK(SO_4)_2$, $K_2SO_4$, and other K or Li alkali metal sulfates, borates, carbonates etc.) Consequently, there is no need to use an adhesive, like in these conventional technologies. Furthermore, even when an adhesive is used to improve the adhesion, the required amount of such an adhesive can be reduced considerably. As a result, it is possible to overcome the above-mentioned conventional incompatibility between the filter ability of removing inclusions and the filter lifetime (the incompatibility means that, when the adhesive amount is increased to ensure the adhesion between the coating compounds and the aggregate meshed member surface, the amount of the coating compound is decreased by the same amount, thereby deteriorating the filter adsorbability).

Another important aspect is that soda silicate does not have a high adhesion to the molten aluminum alloy, whereas it has a high adhesion to the oxide inclusions, such as alumina ($Al_2O_3$), spinel ($MgAl_2O_4$), and magnesia ($MgO$), which take up a large portion of fine inclusions in the molten aluminum alloy. This inclusion-selective adsorbability is extremely important for internal filters. Without the selective adsorbability, only the molten aluminum alloy is likely to cover the coating layer of the coating compound, thereby decreasing the removing-inclusion efficiency of the coating compound. This may lead problems associated with the basic filter performances such as the severe clogging of the filter and the shortened filter life.

Consequently, due to the properties of soda silicate according to the present invention, the coated amount of soda silicate, with which the aggregate meshed member is coated, can be set appropriately in accordance with the inclusion amount and the required removal ability of the filter for the desired cleanliness of the high-quality molten Al. More specifically, it is currently desired a resultant aluminum alloy ingot to contain 200 ppm or less of the oxide inclusions, such as alumina. In order to reduce the inclusion amount to such a low level, the coated amount of soda silicate is adjusted according to the particle size and amount of the inclusions in the molten Al, installation volume (filtering area) of the filter (explained below), the flow rate of the molten Al, or other practical conditions. However, if the aggregate meshed member is coated with too much soda silicate and the filter mesh is too fine, as mentioned above, caused may be practical problems such as the filter clogging within a short-term operation when the inclusion amount is large, a shortened filter life and a poor adhesion between the coating compound and the aggregate meshed member surface. Consequently, it is preferable to select the coated amount of soda silicate within a range of 0.05 g/cm$^3$ to 1.0 g/cm$^3$ in order to prevent these problems.

The coating of the aggregate meshed member with soda silicate is performed by : 1) preparing an aqueous solution (i.e., water glass) with one or more of water-soluble soda silicate compounds, such as sodium meta-silicate ($Na_2SiO_3$), sodium ortho-silicate ($Na_4SiO_4$), $Na_2Si_2O_5$, $Na_2Si_4O_9$, alone or in combination (water vitrification), 2) impregnating the aggregate meshed member with the aqueous solution (i.e., the water glass) and 3) drying the coated aqueous solution. By controlling the viscosity of the water glass (i.e. the concentration of the soda silicate), the amount of soda silicate can be adjusted. When the viscosity is too high, it becomes impossible to impregnate the inner surfaces of the filter openings with the water glass and to sufficiently coat the surfaces with soda silicate. On the other hand, when the viscosity is too low, the coated amount of soda silicate decreases, resulting in the deterioration of the adsorbability.

The filtering of the molten aluminum alloy with the filter manufactured in the above-mentioned manner can be performed at any stage after melting and refining the raw aluminum material in a melting furnace and before supplying the molten Al into a die for casting. Usually, after the melting and refining of the raw aluminum material in a melting furnace, the obtained molten aluminum alloy is transferred into a holding furnace through a molten Al conduit, and transferred again from the holding furnace into the die for casting through another molten Al conduit. During these processes, inclusions are likely to be generated in the molten aluminum alloy, not only when the molten aluminum alloy is hold in the furnaces but also when it is transferred. For example, the inclusions may be generated by the oxidation of Mg, resulting from the head of the molten Al flow (e.g., at connecting portions between each apparatus and the conduit) or agitation of the molten Al (e.g., in the degassing process). Consequently, it is preferred to perform the filtering in a stage as close as possible to the casting process. For this reason, the filter is preferably arranged at a position immediate upstream of the die in the molten Al conduit (that is, between the holding furnace and the die).

Such a preferable arrangement is, for example, shown in FIG. 1. In FIG. 1, raw aluminum material is melt in a melting furnace 4 (if necessary, it is also refined there). The obtained molten Al is transferred through a molten Al conduit 2 to a holding furnace 5, in which it is refined as needed. Then, the molten Al is subjected to degassing by a degassing apparatus 6. The degassed molten Al is transferred through the molten Al conduit 2, to pass through a filter 1 right before the flow reaches a die 3. The holding furnace 4 and degassing apparatus 6 are not necessarily used and, if used, they can be arranged on any stages as needed.

Figure 2:
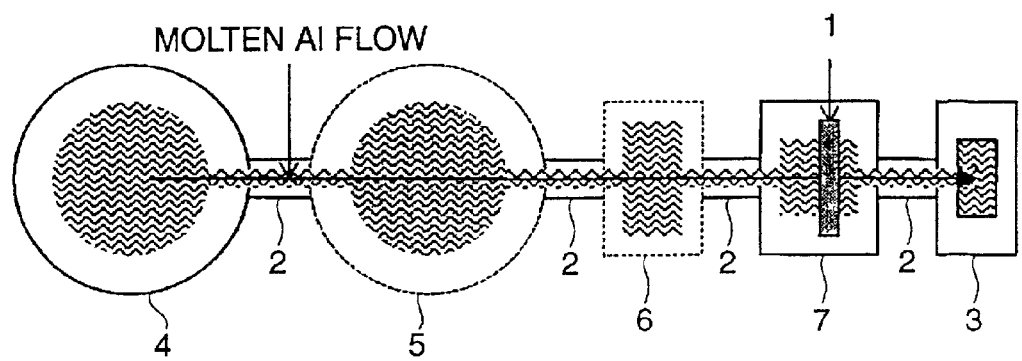
FIG. 2 is a schematic diagram showing a position where a filter for molten Al is arranged according to another embodiment of the present invention.

The filter 1 can be set up in the molten Al conduit 2 like a dam blocking the molten Al flow passing through the molten Al conduit 2. It is also possible to arrange a set of filters as a multi-stage filter (i.e., arrange the filters in parallel). Alternatively, a longer filter having a longer openings can be used to make the filtering time longer and to improve the cleanliness of the filtered molten Al. However, there is a limit to the length and the volume of the molten Al conduit in which the filter is arranged. So, when setting up such a filter that having a larger volume, it is preferable to provide an additional covered molten Al basin or additional molten Al flow path in the molten Al conduit on the way to the die as a filter box. The molten Al is passed through this filter box, in which the filter is set, to be processed. FIG. 2 shows an example of the arrangement having the filter 1 set in a filter box 7.

Figure 3:
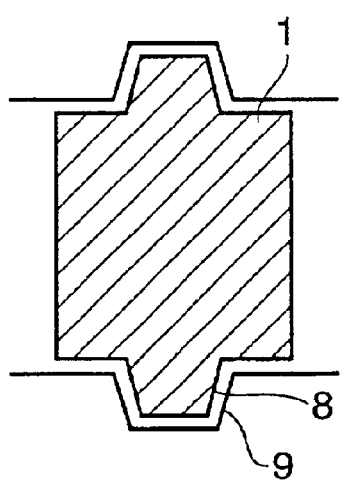
FIG. 3 is a enlarged schematic diagram showing a engagement section for holding a filter according to the present invention.

In order to hold the filter 1 at a given position in the molten Al conduit 2 or filter box 7, the filter 1 is formed with a projection 8 that engages with a recessed acceptor 9 formed in the conduit 2 or filter box 7, as shown in FIG. 3. The projection is formed on the filter opposite side surfaces. Alternatively, it may be appreciated to form the filter into a such shape that its opposite side ends can fit in the recessed acceptor 9. To prevent the molten Al from bleeding from the engagement section between the filter and the conduit or filter box, the gap therebetween is preferably filled with floccular refractor.

There is no particular limitation with regard to the pure aluminum and aluminum alloy subjected to the process of removing inclusions. For example, the present invention can be applied broadly from pure aluminum of the JIS 1000 series to aluminum alloys according to the JIS 2000 series, 3000 series, 4000 series, 5000 series, 6000 series and 7000 series. Furthermore, the filter of the present invention can also be used in combination with a refining method with the purpose of removing metal impurity elements such as Pb, Ti, Sn, or Fe or gas components such as oxygen or hydrogen, from the molten Al.

EXAMPLES

Examples of the filtering method with the filter according to the present invention are explained in the followings.

In examples 1 to 10, various aluminum alloys from the JIS 1000 series to the 7000 series as shown in Table 1 were produced from an raw aluminum alloy material by melting, refining and casting. The melting was performed in air at 750±10° C. in a high frequency induction melting furnace having a content volume of 1000 kg/ch. Then the obtained molten aluminum alloy was adjusted to have each composition listed in table 1 (The alloy numbers listed in the table are based on the U.S. Aluminum Association (AA) standard). The composition-adjusted and refined molten aluminum alloy was guided from the melting furnace to the molten Al conduit through a holding furnace. In the molten Al conduit, a covered filter box was arranged between the holding furnace and the die. In the filter box, the filters of example 1 to 10 were respectively set. In the examples 1 to 10, each molten aluminum alloy of 730 to 740° C. was filtered with the respective filter. The other experimental parameters that were not listed in the table were the same.

TABLE 1

| No. | Example | Al Alloy No. (AA standard) to be cast | Internal Filter Parameters | | | Inclusion removal ratio of the filter (%) |
| --- | --- | --- | --- | --- | --- | --- |
| | | | Coating Compound compositions | Amount of Coating Compound (g/cm$^3$) | Number of meshes per inch | |
| 1 | Inventive Example | 2017 | Na$_2$SiO$_3$ + Na$_4$SiO$_4$ | 0.3 | 6 | 73 |
| 2 | Inventive Example | 3004 | Na$_2$SiO$_3$ + Na$_4$SiO$_4$ | 0.1 | 6 | 72 |
| 3 | Inventive Example | 5052 | Na$_2$SiO$_3$ + Na$_4$SiO$_4$ | 0.5 | 2 | 70 |
| 4 | Inventive Example | 6061 | Na$_2$SiO$_3$ | 0.3 | 3 | 70 |
| 5 | Inventive Example | 7075 | Na$_4$SiO$_4$ | 0.2 | 6 | 77 |
| 6 | Comparative Example | 5052 | NaBr | 0.5 | 3 | 58 |
| 7 | Comparative Example | 5052 | Bi$_2$O$_3$ | 0.5 | 2 | 52 |
| 8 | Comparative Example | 5052 | AlK(SO$_4$)$_2$ | 0.5 | 3 | 53 |
| 9 | Comparative Example | 5052 | Na$_3$AlF$_5$ + NaCl | 0.5 | 3 | 39 |
| 10 | Comparative Example | 5052 | Na$_2$B$_4$O$_7$ | 0.5 | 3 | 50 |

[Filters of Examples 1 to 10]

The filters of examples 1 to 10 were produced as follows. Each of alumina porous plates having a volume of 44000 mm$_3$ and a thickness of 15 mm and, in addition, a number of meshes as listed in Table 1, was made with foamed urethane as described above. The alumina porous plate (i.e., meshed member) was then coated under the respective conditions shown in table 1 (i.e., the compositions of the coating compounds and the coated amounts). Subsequently, three of the coated alumina porous plates were laminated to produce each filter of examples 1 to 10.

In the inventive examples (examples 1 to 5), the coating of the alumina meshed member (in these examples, the above-mentioned laminated alumina porous plates) with soda silicate was performed as follows. An aqueous solution with a water-soluble soda silicate compound, such as Na$_2$SiO$_3$, Na$_4$SiO$_4$, Na$_2$Si$_2$O$_5$, Na$_2$Si$_4$O$_9$, alone or in combination (water vitrification), is prepared. Then, the alumina meshed member was impregnated with the aqueous solution (i.e., water glass) to coat the entire surface thereof including the inner surfaces of its openings with the water glass without use of an adhesive. Subsequently, the water glass was dried, to coat the meshed member surface with soda silicate. The coated amount of soda silicate, with which the meshed member is coated, was adjusted by controlling the viscosity of the water glass (i.e. the concentration of the soda silicate).

On the other hand, in the comparative examples (examples 6 to 10), the coating was performed in the same manner as in the inventive examples (examples 1 to 5) except that the respective coating compounds other than soda silicate were used and that 50 wt % silica sol was added as an adhesive to the respective aqueous solutions with which the meshed members were impregnated.

[Measurement]

Then, the total amounts of the three oxides alumina (Al$_2$O$_3$), spinel (MgAl$_2$O$_4$) and magnesia (MgO) were measured immediately before and after the filtering with the respective filters. These three oxides are primary fine inclusion particles of about 10 to 25 μm contained in the molten Al. For the measurement, a given volume of the molten Al was extracted from "the molten Al to be filtered" immediately before the filtering and from "the filtered molten Al" immediately after filtering. Then each of the extracted molten Al (hereinafter, referred to as "sample molten Al to be filtered" and "sample filtered molten Al" respectively, and as "sample molten Al" as a whole) was cooled and hardened, followed by a quantitative analysis of the above-mentioned three oxide amounts contained therein through Br-methanol method. In this method, each sample molten Al is dissolved in a bromium methanol solution, and the obtained dissolution residue is subjected to a quantitative analysis of the oxides. All of the sample molten Al to be filtered had a total amount of the three oxides of 300 to 400 ppm. The inclusion removal ratio for each filter of examples 1 to 10 was then calculated from the total amounts of the three oxides of the sample molten Al to be filtered and the sample filtered molten Al.

The results are also shown in Table 1. It should be noted that the total oxide amounts were the average of three sample molten Als, which were extracted from the beginning, middle and end of each lot (batch) of the molten Al passing through the molten Al conduit.

As becomes clear from Table 1, in the inventive examples (examples 1 to 5) with soda silicate coating, the removal ratios of the oxide inclusions were 70% or higher, regardless of the aluminum alloy compositions. Consequently, it can be seen that the soda silicate according to the present invention improves the removal ratio of the oxide inclusions per filter unit volume and filter unit weight. It is also found that the soda silicate is effective for decreasing the small inclusion particles of 100 μm or less, which make up most of the inclusions, and in particular for decreasing the fine inclusion particles of about 10 to 25 μm, which needs to be removed for obtaining high quality aluminum alloys. Also, these inventive examples did not give the above mentioned problems such as the clogging of the filter surface within a short-term operation or the shortening of the filter life.

It should be noted that, in these inventive examples, the molten Al to be filtered had 300 to 400 ppm of the oxide inclusions, which is the average level of the inclusions amount in current aluminum melting, refining and casting processes. Consequently, when the required inclusion removal ratio is higher or when the molten Al to be filtered has an increased amount of inclusions due to a higher contents of Al scrap in the raw material, it is possible to ① further increase the effective surface area of the filter or ② make the molten Al flow path through the filter more complex to further increase the contact time between the molten Al and the soda silicate e coating layer of the filter. It is another practical advantage of the present invention that, in cases ① and ②, the filter lifetime does not decrease.

Furthermore, in case ①, the coated amount of soda silicate per filter unit volume can be increased, which results in a more compact filter.

On the other hand, comparative examples with using the coating compounds as described in Japanese Unexamined Patent Publication Nos. 07-207355A and 09-235629A (examples 6 to 10) had only 50% at most of inclusion removal ratios, which were much lower than in the inventive examples. The results reveal that the soda silicate of the present invention has more excellent properties such as adsorbability of inclusions and thereby can be used more practically as the coating compound for the internal filter.

As explained above, with the internal filter of the present invention, it is possible to improve both of the inclusion removal ratio and the filter lifetime. In other words, the internal filter can efficiently reduce the inclusion amounts from the molten Al to a satisfactorily low level. In addition, according to the present invention, such a high performance internal filter can be constituted in a more compact form. Therefore, the present invention is of high industrial value, in that it makes possible to remove inclusions, especially fine inclusions from the molten Al, which is indispensable in aluminum recycling systems using aluminum scrap as the raw material.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A filter for removing inclusions from molten aluminum or molten aluminum alloy, the filter comprising:
    a aggregate meshed member made of a refractory material; and
    a coating layer formed on a surface of the meshed member, the coating layer consisting of soda silicate capable of being softened or viscous at a temperature of the molten aluminum or molten aluminum alloy.

2. The filter according to claim 1, wherein the meshed member has a number of meshes per inch of 2 or more.

3. The filter according to claim 1, wherein the soda silicate is coated directly on the meshed member surface.

4. The filter according to claim 1, wherein the filter is arranged in a position between a melting furnace for melting a raw aluminum material and a die for casting the molten aluminum or molten aluminum alloy supplied thereto.

5. The filter according to claim 4, wherein the filter is arranged in a molten Al conduit for transferring the molten Aluminum or molten Aluminum alloy.

6. The filter according to claim 4, wherein the filter is arranged in a filter box, the filter box being placed in a molten Al conduit in which the molten Aluminum or molten Aluminum alloy is transferred.

7. The filter according to claim 4, wherein a portion or all of the raw aluminum material is made of aluminum alloy scrap.

8. A system for producing an aluminum or an aluminum alloy comprising:
    a melting furnace for melting a raw aluminum material to obtain a molten aluminum or molten aluminum alloy;
    a die for casting the molten aluminum or molten aluminum alloy;
    a molten Al conduit for transferring the molten aluminum or molten aluminum alloy from the melting furnace to the die; and
    a filter provided in the molten Al conduit for removing inclusions from the molten aluminum or molten aluminum alloy, the filter comprising:
        a aggregate meshed member made of a refractory material; and
        a coating layer formed on a surface of the meshed member, the coating layer consisting of soda silicate capable of being softened or viscous at a temperature of the molten aluminum or molten aluminum alloy.

9. The system for producing an aluminum or an aluminum alloy according to claim 8, wherein the filter is arranged in a position immediate upstream of the die.

10. A method for producing an aluminum or an aluminum alloy comprising steps of:
    melting a raw aluminum material to obtain a molten aluminum or molten aluminum alloy;
    removing inclusions from the molten aluminum or molten aluminum alloy by adsorbing inclusions by a filter so as to filter the molten aluminum or molten aluminum alloy; and
    casting the molten aluminum or molten aluminum alloy;
    wherein the filter comprises:
        a aggregate meshed member made of a refractory material; and
        a coating layer formed on a surface of the meshed member, the coating layer consisting of soda silicate capable of being softened or viscous at a temperature of the molten aluminum or molten aluminum alloy.

11. The filter according to claim 1, wherein the soda silicate has a general formula $Na_xSi_yO_z$ (x=2,4; y=1,2,4; z=3,4,5,9).

12. The filter according to claim 11, wherein the soda silicate is at least one of sodium meta-silicate ($Na_2SiO_3$), sodium ortho-silicate ($Na_4SiO_4$), $Na_2Si_2O_5$, and $Na_2Si_4O_9$.

13. The filter according to claim 1, wherein said coating layer consists of $Na_2SiO_3$ and $Na_4SiO_4$.

14. The filter according to claim 1, wherein said coating layer consists of $Na_2SiO_3$.

15. The filter according to claim 1, wherein said coating layer consists of $Na_4SiO_4$.

* * * * *